United States Patent [19]  [11] 4,133,784
Otey et al.  [45] Jan. 9, 1979

[54] BIODEGRADABLE FILM COMPOSITIONS PREPARED FROM STARCH AND COPOLYMERS OF ETHYLENE AND ACRYLIC ACID

[75] Inventors: Felix H. Otey; Richard P. Westhoff, both of Peoria, Ill.

[73] Assignee: The United States of America as represented by the Secretary of Agriculture, Washington, D.C.

[21] Appl. No.: 837,491

[22] Filed: Sep. 28, 1977

[51] Int. Cl.$^2$ ............................ C08L 3/00; C08L 3/04
[52] U.S. Cl. ............................................. 260/17.4 ST
[58] Field of Search ................................. 260/17.4 ST

[56] References Cited

U.S. PATENT DOCUMENTS

| 3,255,130 | 6/1966 | Keim et al. | 260/17.4 ST |
| 3,284,380 | 11/1966 | Davis | 260/17.4 ST |
| 3,590,528 | 7/1971 | Shepherd | 260/45.85 |
| 3,949,145 | 4/1976 | Otey et al. | 260/17.4 ST |
| 3,952,347 | 4/1976 | Comerford et al. | 260/17.4 ST |
| 4,016,117 | 4/1977 | Griffin | 260/17.4 ST |

OTHER PUBLICATIONS

Chemical Week 109, pp. 45 & 46, 1971.
Chemical Week 110, p. 44, 1972.
Cereal Chemistry 40, pp. 154–161, 1963.

Primary Examiner—M. J. Welsh
Attorney, Agent, or Firm—M. Howard Silverstein; David G. McConnell; Curtis P. Ribando

[57] ABSTRACT

Biodegradable film compositions which will withstand outdoor exposure for a desired time and then disintegrate are prepared from starch and ethylene acrylic acid copolymers. These film compositions are useful for agricultural mulch and heat-sealable packaging.

21 Claims, No Drawings

BIODEGRADABLE FILM COMPOSITIONS PREPARED FROM STARCH AND COPOLYMERS OF ETHYLENE AND ACRYLIC ACID

BACKGROUND OF THE INVENTION

1. Field of the Invention

This invention relates to biodegradable films, particularly, those useful for agricultural mulch and heat-sealable packaging films that are stable to weathering conditions for a predetermined period and then decompose.

Applying plastic film for agricultural mulching has become an important technique for increasing the yield and quality of vegetable and fruit crops and for decreasing the production costs of these crops. Principal benefits of mulching are to provide weed control, warm the soil for early crop production, control soil moisture, and reduce nutrient leaching.

The packaging of various items in plastic films has become an important factor in the safe and economical distribution and use of many consumer products.

2. Description of the Prior Art

Polyethylene is the most common resin used for making mulch and packaging films. However, when used as a mulch, it must be removed from the field and burned or buried at the end of each fruiting season since it does not decompose in time to start the subsequent crop. In fact, the film persists for several years if not removed. Because the removal and burying or burning of mulch film is both costly and has an adverse effect on the ecology, the need for a plastic mulch that will decompose by the end of a growing season has recently become apparent. Likewise, the buildup and pollution caused by plastic packaging films in municipal landfill and disposal areas could be reduced if such films were degradable.

Numerous attempts have been made to produce degradable films from petroleum and cellulose derived materials (Chemical Week 109: 45–46 (1971) including polyethylene-coated paper (Chemical Week 110: 44 (1972) and polybutene-1 films (U.S. Pat. No. 3,590,528). None has been completely successful, apparently because they are too costly or they decompose too slowly for many applications.

Although whole starch has been investigated for many years as a potential raw material for nonsupported films, it has never achieved large-scale commercial success because its films are brittle and are greatly affected by moisture (Cereal Chemistry 40: 154–161 (1963). Large amounts of compatible water-soluble plasticizers, such as glycerol, are effective softening agents for whole starch, but the resulting dried films are too soft and tacky at high humidity and have virtually no wet strength. Also, upon contact with water, the plasticizers are readily leached out leaving a brittle product upon drying. A solution to the tackiness and wet strength problem is disclosed by Otey et al. in U.S. Pat. No. 3,949,145 wherein a starch-polyvinyl alcohol glycerol film is coated with a water-resistant coating. However, the application of coatings is expensive and does not completely prevent the leaching of plasticizers. In the area of packaging, starch-based films heretofore known in the prior art have not been heat-sealable.

SUMMARY OF THE INVENTION

It has now been unexpectedly discovered that by producing a composite of a water-dispersible ethylene acrylic acid (EAA) copolymer with a starchy material, flexible and water-resistant films can be prepared which are also self-supporting, biodegradable, and heat-sealable. These films obviate the need for plasticizers and film coatings and eliminate the problems associated therewith as experienced in the prior art. Methods of preparation include casting and extruding heated aqueous dispersions of the starchy material and EAA, and also milling and rolling dry mixtures into sheets or films.

In accordance with this discovery, it is an object of this invention to provide a synthetic agricultural mulch which is biodegradable and does not need to be taken up after the growing season.

It is also an object of the invention to prepare an inexpensive agricultural mulch without the need of plasticizers or coatings.

Another object of the invention is to provide an agricultural mulch which can be readily tailored to withstand outdoor weathering conditions for a predetermined period of exposure.

A further object of the invention is to provide a biodegradable and heat-sealable packaging film which can be readily disposed of without detriment to the environment.

Other objects and advantages of the invention will become readily apparent from the ensuing disclosure.

DETAILED DESCRIPTION OF THE INVENTION

"Films," such as those made in accordance with the invention, are defined by the polymer industry (Encyclopedia of Polymer Science and Technology, John Wiley and Sons, Inc., 1967, Vol. 6, page 764) as "shaped plastics that are comparatively thin in relation to their breadth and width and have a maximum thickness of 0.010 in." Self-supporting films are those "capable of supporting their own weight."

"Composite" is defined herein in accordance with The American Heritage Dictionary of the English Language, New College Edition, published by Houghton Mifflin Company, page 273, to mean "a complex material . . . in which two or more distinct, structurally complementary substances, especially . . . polymers, combine to produce some structural or functional properties not present in any individual component."

The starch-EAA films of the invention are prepared from any unmodifed starch from cereal grains or root crops such as corn, wheat, rice, potato, and tapioca. The amylose and amylopectin components of starch as well as modified starch products such as partially depolymerized starches and derivatized starches may also be used. The term "starchy materials" as used in the specification and in the claims is defined herein to include all starches, starch components, and modified starch products as described above.

In the preparation of the instant starch-based films, it is preferred that the starchy materials be gelatinized. Gelatinization is effected by any known procedure such as heating in the presence of water or an aqueous solution at temperatures of above about 60° C. until the starch granules are sufficiently swollen and disrupted that they form a smooth viscous dispersion in the water. The gelatinization may be carried out either before or after admixing the starchy material with the EAA as discussed further below.

The EAA is a critical component in the preparation of the starch-based films having the properties disclosed herein. It is believed that the pendant carboxyl groups supplied by the acrylic acid component contribute to the water dispersibility of the copolymer. It is also believed that the carboxyl groups associate with the hydroxyl groups of the starch, thereby contributing to the compatibility and composite formation of the starch and the EAA. We have found as a rule of thumb that if the EAA is water dispersible, it will also be compatible with starch for purposes of preparing the disclosed films.

The preferred EAA is a water-dispersible product prepared by copolymerizing a mixture comprising about 20% acrylic acid and 80% ethylene, by weight. However, it is to be understood that EAA copolymers having somewhat different proportions of polymerized acrylic acid and ethylene would also yield acceptable starch-based films provided that they contain a sufficient number of carboxyl groups to be water dispersible.

The relative amounts of starch and EAA used to make the films are dependent upon the particular film applications. As the percentage of starch is increased, the films degrade more rapidly when in contact with soil microorganisms, become more sensitive to water, become stronger and less flexible.

For biodegradable mulch applications, where soil coverage must last for at least 30 days, the films should contain starch in the range of about 20-40%. When a preservative is added to the film, such as paraformaldehyde at a level of 2%, the amount of starch can be increased to about 50-60%. Films with up to 50% starch and 2% paraformaldehyde have been found to last more than 70 days in outdoor soil exposure.

The preferred life of a mulch film is dependent upon the crop application. For quick maturing crops such as lettuce and radishes and for crops that require mulch film for frost protection, the film needs to last only a few days or weeks. Other crops such as tomatoes need a film that will provide soil coverage for a few months.

For packaging applications in which the films are not subjected to biodegradation conditions until after disposal, the proportions of the components can be varied over an even wider range depending upon the physical requirements of the films. For the packaging of dry items where a high degree of flexibility is not required, the starch level may range from 10-90% of the total film composition.

In addition to improving the mechanical properties of starch films, the EAA improves the water resistance and provides heat-sealing properties. EAA levels may range from 10-90% and constitute the full balance of the film compositions not comprised of starch. However, in order for the films to retain flexibility after repeated contacts with water and in order for them to have good heat-sealing qualities, they must contain more than about 20% EAA.

The films are formed by either casting, extruding, or milling the film formulations. In casting, the EAA copolymer and the starch are dispersed in water in an amount of about 5-15 times the weight of the starch, and the resultant suspension is then heated with stirring, cast as a film, and dried in a suitable manner. The EAA and the starch may both be dispersed separately or together by mechanical means such as with a high shear blender. Alternatively, the EAA may first be chemically dispersed in an aqueous ammonium solution wherein the pendant carboxyl groups are converted to their ammonium salts. After casting, the salts are reverted to the acid form by drying at elevated temperatures, thereby driving off ammonia. Preferred drying temperatures are in the range of 110°-130° C. The heating step prior to casting is intended to gelatinize the starch, if necessary, and to remove any bubbles from the dispersion which would otherwise reduce the quality of the film. Temperatures in the range of 60°-100° C., and preferably 80°-100° C., for a period of 0.5-2 hours are sufficient to effect gelatinization. If the starch were gelatinized prior to dispersing with the EAA, milder conditions such as on the order of 50°-100° C. for 0.5-1 hour would be effective for removing the bubbles. Any of the conventional methods of casting and drying films known to those skilled in the art are suitable for the purpose of the invention. Forced air drying and oven drying have been found to be particularly useful.

In an extrusion operation, the starch is mixed with water and heated until it attains a viscosity suitable for producing an extrudable matrix when admixed with the EAA. Heating is continued during admixture with the EAA, and the composite is then extruded through a die as a film. Either the starch may be pregelatinized, or else granular starch is used and the water content and temperatures during the mixing and/or extrusion steps are selected, as within the skill of a person in the art, to effect its gelatinization.

When milled into films, the starch-EAA composites may be prepared from either granular or gelatinized starch. A dry mix of the components is passed through a conventional mill such as a rubber mill at plasticizing temperatures, preferably in the range of about 128°-135° C., and the resultant plasticized matrix is rolled into a thin sheet or film.

Additives may be incorporated into the starch-EAA films to alter the properties during preparation or in use. An organic acid, preferably stearic acid, is added to the formulation to reduce the viscosity of the paste before casting, and to provide good mold release. Amounts in the range of about 0.1-10% are suitable, though amounts of 1-5% based on the dry weight of the film are normally preferred. Other additives include those conventionally incorporated into agricultural mulches and packaging films including fungicides, herbicides, fertilizers, opacifying agents, stabilizers, etc. These additives may be employed in conventional amounts as determined by the skilled artisan.

The reason that these starch-based films have good water resistance and require no plasticizer is not fully understood. Normally, starch molecules are expanded and quite flexible when first cast or extruded from an aqueous dispersion. Upon drying they contract, and various bonding forces cause them to become brittle. Without desiring to be bound to a particular theory, it is possible that the added EAA in accordance with this invention may be associating with the starch molecules enough to hold them in their expanded, flexible state.

The following examples further illustrate the invention but should not be construed as limiting the invention which is defined by the claims.

All percents herein disclosed are "by weight" unless otherwise specified.

EXAMPLES 1-11

Preparation by casting

In a round bottom flask, equipped with a heated water bath, were mixed air-dried granular corn starch, aqueous ammonium dispersion containing 25% EAA (PCX-100 manufactured by Union Carbide Corporation), enough water to equal 10 times the dry weight of starch, and stearic acid. In Examples 6 and 9, enough paraformaldehyde was added to equal 2% of the dry weight of product. The mixtures were then heated by rotating the flask in an 80°-90° C. water bath for 1 hour. Then the resulting thick dispersions were cast with a doctor blade at 30-mil. wet-thickness onto silicone-coated plate glass preheated to 80°-90° C. The products were then dried to clear films in a forced air oven at 120° C. for 5 minutes. The films were immediately removed from the glass plates and equilibrated at 50% relative humidity.

Composition and properties of these films are listed in Table I.

Water resistance

Film samples from each of the Examples listed in Table I were repeatedly soaked in water for 24 hours, then dried for 24 hours for a total of 13 times. Those films (Examples 1-4) that contained 40% or less starch were flexible and strong after the 13 cycles of soaking and drying; those films (Examples 5, 7, and 8) with 50%, 60%, and 70% starch retained a film characteristic but became less flexible as the level of starch was increased; and those films (Examples 10 and 11) with 80% and 90% starch lost their film characteristic during the soaking and drying treatments and became brittle.

Outdoor exposure

Film samples from Examples 3-6, 8, 9, and 11, which contained 30%, 40%, 50%, 70%, and 90% starch were exposed to outdoor soil contact, with their ends buried in soil, to observe their resistance to sunshine, rain, and soil microorganisms. If no rain fell during any week, the samples were sprinkled with enough water to equal ½ inch of rain. Example 11, with 90% starch was badly torn within 1-3 days after water soaking primarily because of embrittlement and shrinkage upon drying. Heavy mold growth occurred on the buried portion of this sample within 3 to 5 days. Similar deterioration was observed for samples containing 50 and 70% starch (Examples 5 and 8) but not until about 5 to 7 days of soil exposure. Examples 3 and 4 that contained 30 and 40% starch remained flexible and intact for more than 30 days. Deterioration of the latter films was attributed primarily to microbial attack, as evidenced by heavy mold growth, rather than embrittlement and shrinkage. Examples 6 and 9, that were formulated with 50% and 70% starch and 2% paraformaldehyde, demonstrated much better resistance to microbial attack. Those with 70% starch and 2% paraformaldehyde (Example 9) became somewhat brittle and had small tears due to shrinkage within 5 to 7 days but they continued to provide soil coverage for about 15 days, while those with 50% starch and 2% paraformaldehyde (Example 6) remained flexible and provided good soil coverage throughout the test period of 70 days.

As long as the films remained in good condition, the soil under them was moist even when the surrounding area became dry. Within a few weeks after the exposed surface of the films became severely damaged, the buried portion had degraded into small particles.

Heat sealing

Film samples from Examples 1-5, 7, 8, 10, and 11 of Table I were folded and placed in a Clamco Handy Bag Sealer, Model 70, made by the Cleveland-Detroit Corporation. Those samples that contained more than 19% EAA (Examples 1-5, 7, and 8) readily formed a tight seal due to melting of the film, while those with 9 and 19% EAA did not melt sufficiently enough to form a strong seal.

EXAMPLE 12

Preparation by extruding

In a Brabender Plastograph was mixed 67.1 g. corn starch and 70 g. water at 115° C. until the viscosity of the mixture was 100 meter-grams of torque. Water evaporated during this mixing such that the mixture was 83% starch and 17% water. Then 42 g. (containing 35 g. of starch) of the mixture was mixed with 35 g. of dry EAA (PCX-300, Union Carbide Corporation) and the composite mixed in the Brabender Plastograph at 115° C. and then extruded through a die as a thin film. The film was flexible and strong.

EXAMPLE 13

Preparation by milling

Various proportions of dry starch and dry EAA (PCX-300, Union Carbide Corporation), ranging from 10-50% starch and 90-50% EAA, were fluxed on a conventional rubber mill at 121°-132° C. for about 10 minutes and then pulled from the rolls as thin sheets or films. All films were flexible and strong.

It is understood that the foregoing detailed description is given merely by way of illustration and that modification and variations may be made therein without departing from the spirit and scope of the invention.

Table I

| Example No. | Composition, wt. % | | | | Properties | | | | | |
|---|---|---|---|---|---|---|---|---|---|---|
| | Starch | EAA | Stearic acid | Formal-dehyde | Thickness (mils.) | Tensile[1] strength (p.s.i.) | Elongation (%) | Fold[2] endurance | Burst[3] factor | Fungi[4] resistance |
| 1 | 10 | 84 | 4 | 0 | 3.1 | 2395 | 181 | 5025 | 18.4 | 0 |
| 2 | 20 | 76 | 4 | 0 | 2.3 | 2483 | 116 | 2972 | 20.7 | 2 |
| 3 | 30 | 66 | 4 | 0 | 2.1 | 2525 | 56 | 1262 | 22.2 | 4 |
| 4 | 40 | 56 | 4 | 0 | 1.9 | 2528 | 44 | 531 | 21.7 | 4 |
| 5 | 50 | 46 | 4 | 0 | 2.2 | 3003 | 35 | 420 | 18.8 | 4 |
| 6 | 50 | 44 | 4 | 2 | — | — | — | — | — | — |
| 7 | 60 | 37 | 3 | 0 | 2.0 | 3186 | 21 | 349 | 20.6 | 4 |
| 8 | 70 | 29 | 1 | 0 | 1.5 | 3933 | 10 | 194 | 19.9 | 4 |
| 9 | 70 | 27 | 1 | 2 | — | — | — | — | — | — |
| 10 | 80 | 19 | 1 | 0 | 1.5 | 5345 | 10 | 61 | 15.0 | 4 |
| 11 | 90 | 9 | 1 | 0 | 1.5 | 7190 | 15 | 94 | 17.9 | 4 |

[1]Scott Tester, Scott Testers, Inc., Providence, Rhode Island.
[2]Folding Endurance Tester, Tinius Olsen Testing Machine Co., Willow Grove Pennsylvania.
[3]The Mullen Tester, B. F. Perkins and Son, Inc., Holyoke, Massachusetts.
[4]ASTM D 1924-70.

We claim:

1. A flexible, self-supporting, and biodegradable film composition comprising a dry composite of a starchy material and a water-dispersible ethylene acrylic acid (EAA) copolymer.

2. A composition as described in claim 1 wherein said starchy material is selected from the group consisting of unmodified starches, modified starches, amylose, and amylopectin.

3. A composition as described in claim 1 wherein said starchy material is an unmodified starch selected from the group consisting of cereal grain starches and root crop starches.

4. A composition as described in claim 1 wherein the amount of starchy material is in the range of 10-90% and the amount of EAA is in the range of 90-10%, both based on the dry weight of said composition.

5. A composition as described in claim 1 wherein the amount of starchy material is in the range of 20-60% and the amount of EAA is in the range of 80-40%, both based on the dry weight of said composition.

6. A composition as described in claim 5 wherein the amount of EAA is at least 20% based on the dry weight of said composition and said composition is further characterized by the property of being heat-sealable.

7. A composition as described in claim 1 and further comprising paraformaldehyde in an amount of about 2% based on the dry weight of said composition.

8. A composition as described in claim 1 and further comprising stearic acid in an amount of 1-5% based on the dry weight of said composition.

9. A method of producing a flexible, self-supporting, and biodegradable film composite comprising the steps of:
   a. providing an aqueous dispersion of a starchy material and an ethylene acrylic acid (EAA) copolymer;
   b. heating said dispersion;
   c. forming said dispersion into a film; and
   d. drying said film.

10. The method as described in claim 9 wherein said starchy material provided in step (a) is gelatinized and said heating in step (b) is at a temperature in the range of 50°-100° C. for a time period of 0.5-1 hour.

11. The method as described in claim 9 wherein said starchy material provided in step (a) is granular and said heating in step (b) is at a temperature in the range of 60°-100° C. for a time period of 0.5-2 hours whereby said granular starch becomes gelatinized.

12. The method as described in claim 9 wherein in step (a) the amount of starchy material is in the range of 10-90% and the amount of EAA is in the range of 90-10%, both based on the dry weight of said composition.

13. The method as described in claim 9 wherein in step (a) the amount of starchy material is in the range of 20-60% and the amount of EAA is in the range of 80-40%, both based on the dry weight of said composition.

14. The method as described in claim 9 wherein said forming in step (c) is effected by casting.

15. The method as described in claim 9 wherein said forming in step (c) is effected by extrusion.

16. A method of producing a flexible, self-supporting, and biodegradable film composite comprising the steps of:
   a. providing a dry mix of a starchy material and an ethylene acrylic acid (EAA) copolymer;
   b. milling said dry mix at a plasticizing temperature to provide a plasticized matrix; and
   c. rolling said plasticized matrix into a film.

17. The method as described in claim 16 wherein said starchy material provided in step (a) is gelatinized.

18. The method as described in claim 16 wherein said starchy material provided in step (a) is granular.

19. The method as described in claim 16 wherein in step (a) the amount of starchy material is in the range of 10-90% and the amount of EAA is in the range of 90-10%, both based on the dry weight of said composition.

20. The method as described in claim 16 wherein in step (a) the amount of starchy material is in the range of 20-60% and the amount of EAA is in the range of 80-40%, both based on the dry weight of said composition.

21. The method as described in claim 16 wherein said plasticizing temperature in step (b) is in the range of about 120°-135° C.

* * * * *